UNITED STATES PATENT OFFICE.

WILLIAM A. HALL, OF BELLOWS FALLS, VERMONT.

CASEIN SOLUTION.

SPECIFICATION forming part of Letters Patent No. 695,927, dated March 25, 1902.

Application filed July 27, 1901. Serial No. 69,923. (No specimens.)

*To all whom it may concern:*

Be it known that I, WILLIAM A. HALL, a citizen of the United States, residing at Bellows Falls, in the county of Windham and State of Vermont, have invented or discovered certain new and useful Improvements in Casein Solutions, of which the following is a specification, reference being had therein to the accompanying drawings.

When the whey resulting from the precipitation of casein is to be utilized for the manufacture of milk-sugar, it is the common practice, if an acid precipitate be used, to employ muriatic (hydrochloric) acid, for the reason that if sulfuric acid be used as the precipitant a sulfate is formed, and this sulfate is injurious to the sugar and can be removed therefrom only with great difficulty, and is also objectionable for the reason that it forms a scale on the evaporating-pans. This muriatic-acid casein cannot be advantageously used in the arts for many purposes, for the reason that it is enormously absorptive, and when dissolved with most solvents it absorbs such a large amount of water that it does not possess the requisite sticky or glutinous characteristics necessary to render it suitable for some of the largest uses for which solutions of casein are employed, as in paper-coating and the like, and it also forms a heavy mass too thick to be advantageously handled. I have discovered, however, that if a phosphate of soda, preferably a trisodium phosphate, be used as a solvent for the muriatic-acid casein, either by itself or in connection with a small proportion of other solvents, a comparatively thin solution of the casein is obtained and one which has all of the sticky characteristics to render it suitable for use in paper-coating and the like, where it could not heretofore advantageously be employed. In fact, a solution thus made with muriatic-acid casein is considerably thinner than the ordinary solutions of sulfuric-acid casein made with ammonia or a carbonate of soda. This discovery has therefore made it possible to utilize the muriatic-acid casein for all purposes for which casein is ordinarily employed in the arts.

In carrying my discovery into effect the muriatic-acid casein is formed into a solution by the addition thereto of ten per cent. to fifteen per cent. of its weight of phosphate of soda, preferably trisodium phosphate, mixed with one to three parts, by weight, of water to each part of the casein. Such a mixture will form a comparatively thin solution, in fact, quite as thin or possibly thinner than can be formed with four to six parts of water employed with any other solvent for the muriatic-acid casein, and the solution thus obtained by the sodium phosphate is quite workable and can advantageously be employed in the manufacture of paper-coatings and for many other purposes in the arts.

In using this solution of muriatic-acid casein in the manufacture of paper-coating another great advantage arises, in that I have discovered that solutions of casein made with trisodium phosphate do not affect the enamel on lithographic stones, and which enamel is usually composed of gum-arabic and nitric acid. This enamel is easily destroyed by ammonia and sodium salts other than triphosphate of soda, and for this reason papers which have been coated with solutions containing ammonia or the soda salts referred to cannot very well be used in the manufacture of lithographic papers or papers to be printed by the lithographic process.

Having thus described my said invention or discovery, I claim and desire to secure by Letters Patent—

1. The herein-described casein solution, formed of muriatic-acid precipitated casein, phosphate of soda, and water, in substantially the proportions stated.

2. The herein-described casein solution formed of muriatic-acid precipitated casein, triphosphate of soda, and water, in substantially the proportions stated.

In testimony whereof I affix my signature in presence of two witnesses.

WILLIAM A. HALL.

Witnesses:
   H. CUSHMAN,
   C. M. SWEENEY.